United States Patent
Maziers

(10) Patent No.: US 7,807,096 B2
(45) Date of Patent: ***Oct. 5, 2010

(54) INJECTION BLOW MOLDED SINGLE LAYER METALLOCENE POLYETHYLENE CONTAINER

(75) Inventor: Eric Maziers, Seneffe (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 1156 days.

This patent is subject to a terminal disclaimer.

(21) Appl. No.: 11/434,438

(22) Filed: May 15, 2006

(65) Prior Publication Data
US 2006/0269709 A1     Nov. 30, 2006

Related U.S. Application Data

(63) Continuation of application No. 10/487,661, filed as application No. PCT/EP02/09525 on Aug. 23, 2002, now abandoned.

(51) Int. Cl.
| | |
|---|---|
| *B29C 39/02* | (2006.01) |
| *B29C 43/02* | (2006.01) |
| *B29C 45/00* | (2006.01) |
| *B29C 47/00* | (2006.01) |
| *B29C 49/00* | (2006.01) |
| *B29C 49/08* | (2006.01) |
| *B29C 67/00* | (2006.01) |
| *B29C 71/00* | (2006.01) |

(52) U.S. Cl. .................... 264/537; 428/35.7; 428/36.92; 428/500; 428/516

(58) Field of Classification Search ................. 425/533; 264/535, 537; 428/35.7, 36.9, 36.92, 500, 428/516
See application file for complete search history.

(56) References Cited

U.S. PATENT DOCUMENTS 6,063,871 A * 5/2000 Kishine et al. .............. 525/240
2001/0048988 A1    12/2001 Forte et al.

* cited by examiner

*Primary Examiner*—Michael C Miggins
(74) *Attorney, Agent, or Firm*—Tenley R. Kruegar

(57) ABSTRACT

A method of preparing a single layer hollow packaging by injection blow moulding, using a metallocene-produced polyethylene and produced by injection blow moulding, characterized in that said hollow packaging has an external and internal gloss of at least 30 and said metallocene-produced polyethylene has a density of from 0.910 up to 0.966 g/cm$^3$ or up to homopolymer densities and a melt index MI2 of from 0.5 to 2.5 g/10 min. An article produced by such method is also disclosed.

17 Claims, 2 Drawing Sheets

US 7,807,096 B2

INJECTION BLOW MOLDED SINGLE LAYER METALLOCENE POLYETHYLENE CONTAINER

RELATED APPLICATIONS

This is a continuation application of U.S. patent application Ser. No. 10/487,661, which was filed on Sep. 17, 2004 now abandoned, which claims priority from International Application PCT/EP02/09525, filed on Aug. 23, 2002.

FIELD OF THE INVENTION

This invention is related to hollow packagings having improved optical properties and in particular to the production of high gloss bottles, jars, etc. formed of polyethylene by injection blow moulding.

BACKGROUND OF THE ART

Several methods have been sought to produce high gloss bottles presenting good processability and good mechanical properties but all the blends and techniques used so far present various disadvantages.

High gloss high density polyethylene (HDPE) has been used: it is characterised by a very narrow molecular weight distribution that is typically inferior to 8. The molecular weight distribution can be completely defined by means of a curve obtained by gel permeation chromatography. Generally, the molecular weight distribution (MWD) is more simply defined by a parameter, known as the dispersion index D, which is the ratio between the average molecular weight by weight (Mw) and the average molecular weight by number (Mn). The dispersion index constitutes a measure of the width of the molecular weight distribution. It is known that a resin of narrow molecular weight distribution will produce plastic containers of very high gloss but simultaneously, that such resin will be very difficult to process and will be characterised by very poor mechanical properties. It has also been observed that said resins have poor mechanical properties, particularly, a very low environmental stress crack resistance (Modern Plastic International, August 1993, p. 45).

The coextrusion of high density polyethylene (HDPE) with a thin external layer of polyamide has been used to produce bottles of very high gloss but that method suffers the major drawback of necessitating an adhesive layer between the HDPE and the polyamide layers.

The coextrusion of high density polyethylene and an external layer of low density polyethylene leads to bottles with a fair gloss. These bottles however have an unpleasant greasy touch and offer a very poor resistance to scratching.

In another method, disclosed in co-pending European Patent Application n° 00201155.9, high gloss plastic containers comprise an internal layer including a polyolefin and an external layer including a styrenic component containing from 40 to 85 wt % of styrene, based on the weight of the external.

There is thus a need for a method for efficiently producing hollow packagings of very high gloss as well as good processability and mechanical properties by injection moulding.

An aim of the present invention is to produce hollow packagings that offer simultaneously the desired glossy appearance and a good resistance to scratching.

It is also an aim of the present invention to obtain glossy hollow packagings with good processability and good mechanical properties.

BRIEF DESCRIPTION OF THE DRAWINGS

For a detailed understanding and better appreciation of the present invention, reference should be made to the following detailed description of the invention and the preferred embodiments, taken in conjunction with the accompanying drawings, wherein.

DETAILED DESCRIPTION OF INVENTION

Figure 1:
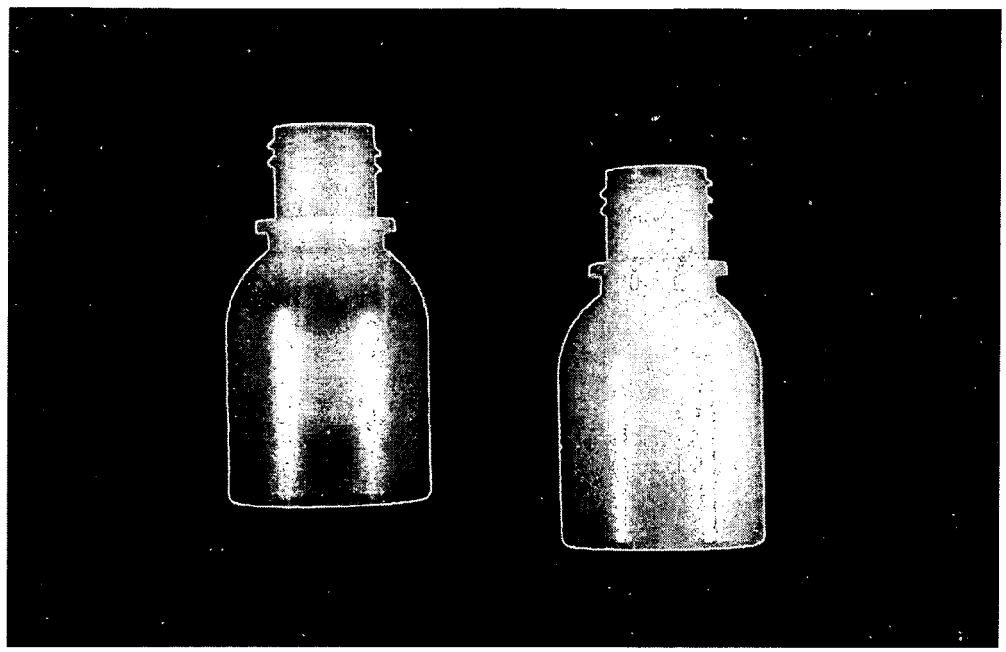
FIG. 1 shows bottles prepared by injection blow moulding with a low-density polyethylene produced with the metallocene catalyst ethylene bis(tetrahydroindenyl)zirconium dichloride and a low-density polyethylene produced by Dupont.

The present invention provides single layer hollow packagings, which consist essentially of metallocene-produced polyethylene having a density of from 0.915 g/cm$^3$, preferably from 0.925 g/cm$^3$ up to 0.966 g/cm$^3$, or up to homopolymer densities, and a melt index MI2 of from 0.2 to 5 g/10 min, preferably of from 0.5 to 2.5 g/10 min, and most preferably of from 0.5 to 2 g/10 min, characterised in that said hollow packagings are produced by injection blow moulding and have an external and internal gloss of at least 30.

In this specification, the density of the polyethylene is measured at 23° C. using the procedures of ASTM D 1505.

The melt index MI2 is measured using the procedures of ASTM D 1238 at 190° C. using a load of 2.16 kg. The high load melt index HLMI is measured using the procedures of ASTM D 1238 at 190° C. using a load of 21.6 kg.

A number of different metallocene catalyst systems have been disclosed for the manufacture of polyethylene, in particular medium-density polyethylene (MDPE) and high-density polyethylene (HDPE) suitable for injection blow moulding. It is known in the art that the physical properties, in particular the mechanical properties, of a polyethylene product vary depending on what catalytic system was employed to make the polyethylene The HDPE can be polymerised with a metallocene catalyst system capable of producing a mono- or bi- or multimodal distribution, either in a two step process such as described for example in EP-A-0,881,237, or as a dual or multiple site catalyst in a single reactor such as described for example in EP-A-0,619,325.

Any metallocene catalyst known in the art can be used in the present invention.

It is represented by the general formula:

$$(Cp)_m MR_n X_q \qquad \text{I.}$$

wherein Cp is a cyclopentadienyl ring, M is a group 4b, 5b or 6b transition metal, R is a hydrocarbyl group or hydrocarboxy having from 1 to 20 carbon atoms, X is a halogen, and m-1-3, n=0-3, q=0-3 and the sum m+n+q is equal to the oxidation state of the metal.

$$(C_5R'_k)_g R''_s (C_5R'_k) MQ_{3-g} \qquad \text{II.}$$

$$R''_s (C_5R'_k)_2 MQ' \qquad \text{III.}$$

wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$-$C_6$ ring, R" is a $C_1$-$C_4$ alkylene radical, a dialkyl germanium or silicon or siloxane, or a alkyl phosphine or amine radical bridging two $(C_5R'_k)$ rings, Q is a hydrocarbyl radical such as aryl, alkyl, alkenyl, alkylaryl, or aryl alkyl radical having from 1-20 carbon atoms, hydrocarboxy radical having 1-20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1 and k is 5 when s is 0, and M is as defined above.

Among the preferred metallocenes used in the present invention, one can cite among others ethylene bis-(tetrahydroindenyl) zirconium dichloride, ethylene bis-(indenyl) zirconium dichloride or bis-(n-butylcyclopentadienyl)zirconium dichloride mono-, di- or tri-substituted as disclosed for example in EP-A-870,048.

The metallocene may be supported according to any method known in the art. In the event it is supported, the support used in the present invention can be any organic or inorganic solids, particularly porous supports such as talc, inorganic oxides, and resinous support material such as polyolefin. Preferably, the support material is an inorganic oxide in its finely divided form.

An active site must be created by adding an activating agent having an ionising action.

Preferably, alumoxane is used as activating agent during the polymerization procedure, and any alumoxane known in the art is suitable.

The preferred alumoxanes comprise oligomeric linear and/or cyclic alkyl alumoxanes represented by the formula:

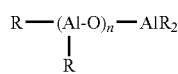

(IV)

for oligomeric, linear alumoxanes, and

(V)

for oligomeric, cyclic alumoxanes, wherein n is 1-40, preferably 10-20, m is 3-40, preferably 3-20 and R is a $C_1$-$C_8$ alkyl group and preferably methyl. Methylalumoxane is preferably used.

When alumoxane is not used as a cocatalyst, one or more aluminiumalkyl represented by the formula $AlR_x$ are used wherein each R is the same or different and is selected from halides or from alkoxy or alkyl groups having from 1 to 12 carbon atoms and x is from 1 to 3. Especially suitable aluminiumalkyl are trialkylaluminium, the most preferred being triisobutylaluminium (TIBAL).

The metallocene catalyst utilised to produce a polyethylene, as required for preparing the high gloss hollow packagings of the present invention, can be used in gas, solution or slurry polymerisation. Preferably, the polymerization process is conducted under slurry phase polymerization conditions. The polymerisation temperature ranges from 20 to 125° C., preferably from 60 to 95° C. and the pressure ranges from 0.1 to 5.6 Mpa, preferably from 2 to 4 Mpa, for a time ranging from 10 minutes to 4 hours, preferably from 1 and 2.5 hours). It is preferred that the polymerization reaction be run in a diluent at a temperature at which the polymer remains as a suspended solid in the diluent.

A continuous loop reactor is preferably used for conducting the polymerisation. Multiple loop reactors can also be used.

The average molecular weight is controlled by adding hydrogen during polymerisation. The relative amounts of hydrogen and olefin introduced into the polymerisation reactor are from 0.001 to 15 mole percent hydrogen and from 99.999 to 85 mole percent olefin based on total hydrogen and olefin present, preferably from 0.2 to 3 mole percent hydrogen and from 99.8 to 97 mole percent olefin.

The density of the polyethylene is regulated by the amount of comonomer injected into the reactor; examples of comonomer which can be used include 1-olefins butene, hexene, octene, 4-methyl-pentene, and the like, the most preferred being hexene.

The densities of the polyethylenes required for preparing the hollow packagings of the present invention range from 0.915 g/cm³, preferably from 0.925 g/cm³ up to 0.966 g/cm³, or up to homopolymer densities.

The melt index of polyethylene is regulated by the amount of hydrogen injected into the reactor. The melt indexes useful in the present invention range from 0.2 to 5 g/10 min and preferably from 0.5 g/10 min to 2.5 g/10 min.

The polyethylene resin used in the present invention can be prepared with either a single site metallocene catalyst or with a multiple site metallocene catalyst and it has therefore either a monomodal or a bimodal molecular weight distribution. The molecular weight distribution is of from 2 to 20, preferably, of from 2 to 7 and more preferably of from 2 to 5.

The polyethylene resins produced in accordance with the above-described processes have physical properties making them particularly suitable for use as injection blow moulding grade polyethylenes. In addition, it has surprisingly been observed that they have excellent processability even when their molecular weight distribution is narrow.

The polyethylene resins of the present invention are used preferably for producing containers of a capacity ranging from 0.0005 to 2 l. They are more preferably used for producing food packaging, such as for example milk bottles or juice bottles, cosmetic or pharmaceutical packaging and household packaging.

The injection moulding machine, can be any one of the machines generally used for injection-blow-moulding, such as for example the JOMAR and UNILOY machines. They are continuous injection-blowing-ejection machines with up to 16 injection-blowing dies that can be used for the production of polyethylene containers of up to 0.8 liter capacity.

The hollow packagings of the present invention are characterised by a very high gloss for both inner and outer surfaces, as measured using the ASTM D 2457-90 test, a low haze as measured by ASTM D 1003-92, and an outstanding resistance to drop. In addition, because of the very smooth inner surfaces, it is possible to increase the pouring speed and to decrease the amount of residue left in the packaging.

The impact strength was measured on moulded plates at −30° C. following the method of standard test ISO 8256.

Additionally and quite surprisingly, the production rate is very high even though the melt index is low. The process is very stable and the packagings are produced with an excellent success rate.

EXAMPLES

Several polyethylene resins were prepared and tested for gloss, haze, impact strength and drop.

Resin R1.

The polyethylene resin R1 was obtained by continuous polymerisation in a loop slurry reactor with a supported and ionised metallocene catalyst prepared in two steps by first reacting $SiO_2$ with MAO to produce $SiO_2$.MAO and then reacting 94 wt % of the $SiO_2$.MAO produced in the first step with 6 wt % of ethylene bis-(tetrahydroindenyl) zirconium dichloride. The dry catalyst was slurried in isobutane and pre-contacted with triisobutylaluminium (TIBAI, 10 wt % in hexane) before injection in the reactor. The reaction was conducted in a slurry loop reactor with the polymerisation temperature being maintained at 90° C. The operating conditions were as follows:

TI BAI conc (ppm): 100-200
iC4 feed (kg/h): 1940
C2 feed (kg/h): 3900
C6 feed (g/kg C2): 22
H2 feed (g/t): 42

Wherein, C2 is ethylene, C6 is 1-hexene, iC4 is isobutane and TIBAI is triisobutylaluminium.

Resin R2.

The polyethylene resin R2 was prepared following the same procedure as that used for polymerising resin R1 except that the metallocene catalyst was bis-(butylcyclopentadienyl) zirconium dichloride. The cocatalyst was also TIBAI (10 wt % in hexane) and the polymerisation temperature was 90° C. The operating conditions were as follows:

IC4 feed (kg/h): 24
C2 feed (cc/h): 9
C6 feed (cc/h): 27
H2 feed (Nl/h): 1.9
TI BAI conc (ppm): 292

Resin R3.

Resin R3 is a monomodal polyethylene resin produced with a chromium catalyst, commercialised under the name ®Finathéne 5502: it was prepared with a supported chromium catalyst Resin R4.

Resin R4 is a low density polyethylene resin, produced by Dupont under the name ®DuPont 20-6064 for applications in injection blow moulding.

The resins R1 to R3 were prepared with hexene as comonomer.

The properties of these resins are summarised in Table I.

The impact strength was measured on moulded plates, at a temperature of −30° C. and following the method of standard test ISO 8256.

Resins R1 and R3 were injection-blow-moulded with the UNILOY injection-blowing machine under the processing conditions summarised in Table II.

Resins R2 and R4 were processed with the injection-blow-moulding (IBM) machine, 15 model available from Jomar. The injection blow moulding process is divided into three steps:

1. the injection step, wherein the molten polymer is injected through nozzles into heated preform moulds forming the external shape, said moulds being clamped around core rods forming the internal shape;
2. the blowing step wherein the core rods allow compressed air into the preforms that inflate to the shape of the chilled blow moulds; and
3. the ejection step wherein after a cooling period, the finished article is stripped off the core rod.

The machine and mould characteristics are summarised in Table III. The general purpose mixing screw has a diameter of 25.4 mm and a length to diameter ratio L/D of 30:1.

The extruded articles all exhibit a very high gloss and an excellent impact strength.

TABLE II

| Resin | Mass Temp. ° C. | Cycle time S | Int. gloss 60° % | Ext. gloss 60° % |
|---|---|---|---|---|
| R1 | 200-210 | 16.49 | 72 | 38 |
| R2 | 210-220 | 15.07 | n.a. | 62 |
| R3 | 230-240 | 19.30 | 20 | 22 |
| R4 | 180-200 | 15.13 | n.a. | n.a. | n.a.: not available

Figure 2:
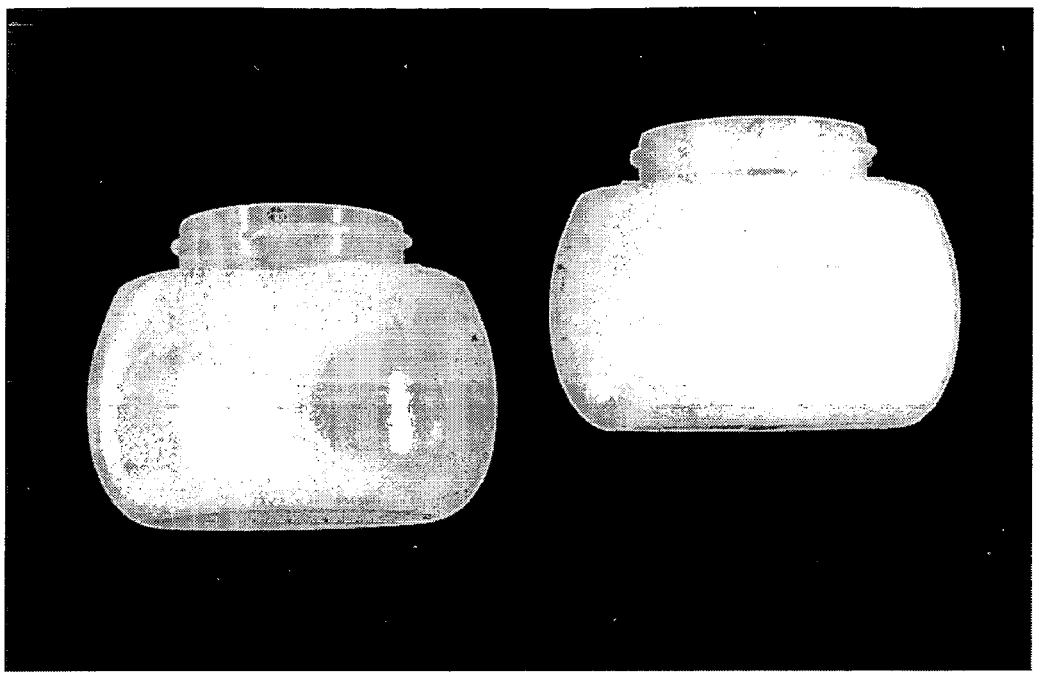
FIG. 2 represents bottles prepared by injection blow moulding with a medium-density polyethylene produced with the metallocene catalyst ethylene bis(tetrahydroindenyl)zirconium dichloride and a medium-density polyethylene produced with a chromium catalyst.

During processing, resins R1 and R2 showed a very high process-stability, a very high percentage of well-formed bottles, a good weight consistency. The bottles obtained were very glossy as compared to those obtained with resins R3 and R4. This can be clearly seen in FIG. 1 representing bottles prepared by injection blow moulding respectively with a low-density polyethylene produced with the metallocene catalyst ethylene bis(tetrahydroindenyl)zirconium dichloride and a low-density polyethylene produced by Dupont and in FIG. 2 representing bottles prepared by injection blow moulding respectively with a medium-density polyethylene produced with the metallocene catalyst ethylene bis(tetrahydroindenyl) zirconium dichloride and a medium-density polyethylene produced with a chromium catalyst.

TABLE III

| | | |
|---|---|---|
| Preform clamp | @ 141 kg/cm² (tons) | 11.4 |
| Casting area | @ 246 kg/cm² (cm²) | 46 |
| | @ 387 kg/cm² (cm²) | 29 |
| Blow mould clamp | @ 141 kg/cm² (tons) | 2.9 |

TABLE I

| Resin | Density g/cm³ | HLMI g/10' | MI2 g/10' | Mn | Mw | Mz | Imp. Str. kj/m² | MWD |
|---|---|---|---|---|---|---|---|---|
| R1 | 0.934 | 25.1 | 0.96 | 34083 | 88134 | 167888 | 170 | 2.6 |
| R2 | 0.950 | 27 | 1.6 | 34624 | 92729 | 201616 | 130 | 2.7 |
| R3 | 0.953 | 17.65 | 0.19 | 19620 | 153558 | 1333100 | 80 | 7.8 |
| R4 | 0.92 | n.a. | 1.9 | n.a. | n.a. | n.a. | n.a. | n.a. | n.a.: not available

TABLE III-continued

| | |
|---|---|
| Shut height (mm) | 203.2 |
| Press stroke (mm) | 101.6 |
| Max. die set size (mm) | 254 × 286 |
| Tigger Bar lrength mm) | 166 |
| Max. swing length (mm) | 356 |
| Shot capacity (g)$^a$ | 50 |
| Motor size (kw) | 15 |

Five additional metallocene-produced polyethylene resins, R5 to R9, were tested at Jomar facilities in the U.S.A. Resins R5 and R6 were prepared with bis(butylcyclopentadienyl) zirconium dichloride and R7 to R9 were prepared with ethylene bis(tetrahydroindenyl) zirconium dichloride.

For comparison polyethylene resin R10, prepared with a chromium-based catalyst system and polyethylene resin R11, prepared with a Ziegler-Natta catalyst system were also tested under similar conditions.

The properties of these resins are summarised in Table IV.

TABLE IV

| Resin | MI2 g/10' | Density g/cm$^3$ | Mn | Mw | Mz | MWD |
|---|---|---|---|---|---|---|
| R5 | 2.36 | 0.954 | 31628 | 80859 | 155635 | 2.6 |
| R6 | 11 | 0.958 | 20417 | 51223 | 94478 | 2.5 |
| R7 | 2.04 | 0.949 | 25937 | 68841 | 138233 | 2.7 |
| R8 | 0.85 | 0.934 | 23882 | 80224 | 201417 | 3.4 |
| R9 | 0.65 | 0.947 | 32034 | 87444 | 182364 | 2.7 |
| R10 | 0.3 | 0.955 | | | | |
| R11 | 1.2 | 0.962 | | | | |

Two different moulds were used for testing the injection blow moulding performances of these resins:
- a system equipped with a four cavities 1-oz (28.35 g) shampoo bottle mould, and
- a system equipped with a 10 cavities 3-oz (85.05 g) round jar mould.

The results obtained confirm the trends already observed with resins R1 to R4:
- the optical properties of the metallocene-produced resins R5 to R9 are significantly better than those of resins R10 and R11 prepared respectively with a chromium-based and a Ziegler-Natta catalyst;
- the cycle time of the metallocene-produced resins R5 to R9 is significantly shorter than that of resins R10 and R11;
- increasing the melt index MI2 of the resin decreases the cycle time but narrows the processing window, the narrowing of the processing window being less severe for the metallocene-based resins R5 to R9 than for the chromium-based or Ziegler-Natta-based resins R10 and R11;
- resins R7 to R9 prepared with ethylene bis(tetrahydroindenyl) dichloride have a shorter cycle time and a lower shear visvosity (in the shear rate region of 1000 s-1) and thereby a better processability than resins R5 and R6 prepared with bis(butylcyclopentadienyl) zirconium dichloride;
- resins R7 to R9 provide a better mould replication than resin R11.

In addition, the following characteristics were evaluated for each of the 1-oz (28.35 g) bottles:
weight
wall thickness distribution
gloss
height
bottle diameter
neck diameter The gloss was measured varying the melt temperature, the melt index MI2 and the mould: a polished mould and a sand-blasted mould were used.

The gloss results are presented in Table V and the other measurements are summarised in Table VI.

TABLE V

| Resin | MI2 g/10' | Melt Temp. ° C. | Sand-blasted mould | Polished mould |
|---|---|---|---|---|
| R5 | 2.36 | 185 | 33.6 | 62.9 |
| R5 | 2.36 | 215 | 28.8 | 63.4 |
| R7 | 2.04 | 185 | 33.5 | 67.2 |
| R8 | 0.85 | 185 | 25.4 | 71.6 |
| R8 | 0.85 | 215 | 21.3 | 81.7 |
| R10 | 0.3 | 215 | 32.1 | 47.9 |
| R11 | 1.2 | 215 | 24.8 | 73 |

It can be concluded from Table V that for a polished mould, the optical properties improve with increasing melt temperature at similar melt index. This is due to a better mould replication as can de deduced when comparing the gloss results for the polished and sand-blasted moulds at high temperature for resin R8. Increasing the melt index reduces the optical properties as can be seen when comparing the gloss results obtained for the polished moulds with resins R7 and R8.

TABLE VI

| Resin | Melt temp. ° C. | Weight G | Height mm | Bottle diam. mm | Neck diam. mm |
|---|---|---|---|---|---|
| R5 | 185 | 6.19 | 80.41 | 25.74 | 15.29 |
| R5 | 215 | 6.06 | 80.39 | 25.78 | 15.18 |
| R7 | 185 | 6.19 | 80.44 | 25.77 | 15.29 |
| R8 | 185 | 6.1 | 80.27 | 25.76 | 15.27 |
| R8 | 215 | 6.04 | 80.23 | 25.73 | 15.19 |
| R10 | 195 | — | 80.43 | 25.83 | 15.36 |
| R10 | 215 | 6.06 | 80.36 | 25.03 | 15.27 |
| R11 | 215 | 6.08 | 80.36 | 25.76 | 15.33 |

It can be concluded from Table VI that the metallocene-prepared polyethylene resins R5, R7 and R8 produce bottles with smaller neck diameter than resins R10 and R11. It is also observed that lowering the melt temperature leads to a slight weight increase of the bottles.

The thickness distribution of the 1-oz (28.35 g) bottles has also been studied. For that purpose, the bottle height has been divided into four equal parts, and for each of these four heights, the thickness has been measured at four points equally spaced on the circumference of the bottle. The walls of the bottles have a thickness of about 1 mm. It has been observed that resins R5 to R9 have an excellent thickness distribution very little affected by the melt temperature and better than that obtained for the bottles produced with resins R10 and R11. It has also been observed that increasing the melt index to values above 2 g/10 min leads to poor thickness distribution for the bottles produced with metallocene-based polyethylene resins.

These results show unambiguously the improved qualities of gloss, cycle time, dimensional stability and impact strength of the hollow packagings obtained with metallocene-produced polyethylene.

I claim:

1. A method of using a polished mold to prepare a single layer hollow packaging by injection blow molding, comprising:

obtaining a metallocene produced-polyethylene having:
a density of from 0.910 up to 0.966 g/cm$^3$, a melt index MI$_2$ of from 0.5 g/10 min to 2.5 g/10 min;
preparing a single layer hollow packaging by injection blow molding said polyethylene, said hollow packaging having an external surface gloss of at least 30 and an internal surface gloss of at least 30 (as measured using the method of standard test ASTM D 2457-90) when injection blow molded with a non-porous mold; and
where said polyethylene is produced by polymerizing ethylene in the presence of a metallocene catalyst selected from the group consisting essentially of ethylene bis-(tetrahydroindenyl) zirconium dichloride, ethylene bis-(indenyl)zirconium dichloride, and bis-(n-butylcyclopentadienyl) zirconium dichloride.

2. The method of claim 1, wherein the external gloss increases with increasing melt temperature at a similar melt index.

3. The method of claim 1, wherein the polyethylene has a molecular weight distribution of from 2 to 7.

4. The method of claim 1, wherein the single layer hollow packaging has uniform wall thickness distribution.

5. The method of claim 1, wherein the single layer hollow packaging is produced with a short cycle time of 20 seconds or less.

6. The method of claim 1, wherein the melt index is measured using the procedures of ASTM D 1238 at 190° C. using a load of 2.16 kg.

7. The hollow packaging article of claim 1, wherein said single layer wall structure is configured to define a chamber to provide packaging for cosmetic or pharmaceutical products.

8. The method of claim 1, wherein said polyethylene is a co-polymer of ethylene and a higher molecular weight alpha olefin.

9. The method of claim 8, wherein said alpha olefin is selected from the group consisting of butene, hexene, octene and 4-methyl pentene.

10. The method of claim 8, wherein said higher molecular weight alpha olefin is hexane.

11. The method of claim 1, wherein said single layer wall structure is formed of a metallocene-produced polyethylene homopolymer.

12. A hollow, high-gloss packaging article produced by the method of claim 1.

13. The hollow packaging article of claim 12, wherein said metallocene-produced polyethylene has a melt index of from 0.5 to 2.0 g/10 min.

14. The hollow packaging article of claim 12, wherein the metallocene-produced polyethylene has a molecular weight distribution within the range of from 2 to 5.

15. The hollow packaging article of claim 12, wherein said single layer wall structure is configured to define a chamber to provide a container for a liquid.

16. The hollow packaging article of claim 12, wherein said single layer wall structure is configured to define a chamber to provide a container for food.

17. A method of using a polished mold to prepare a single layer hollow packaging by injection blow molding, comprising:
obtaining a metallocene produced-polyethylene having:
a density of from 0.910 up to 0.966 g/cm$^3$, a melt index MI$_2$ of from 0.5 g/10 min to 2.5 g/10 min;
preparing a single layer hollow packaging by injection blow molding said polyethylene, said hollow packaging having an external surface gloss of at least 30 and an internal surface gloss of at least 30 (as measured using the method of standard test ASTM D 2457-90); and
where said polyethylene is produced by polymerizing ethylene in the presence of a metallocene catalyst selected from the group consisting essentially of ethylene bis-(tetrahydroindenyl) zirconium dichloride, ethylene bis-(indenyl)zirconium dichloride, and bis-(n-butylcyclopentadienyl) zirconium dichloride and wherein non-tinted polyethylene is used to prepare said packaging.

* * * * *

UNITED STATES PATENT AND TRADEMARK OFFICE
CERTIFICATE OF CORRECTION

PATENT NO. : 7,807,096 B2  Page 1 of 1
APPLICATION NO. : 11/434438
DATED : October 5, 2010
INVENTOR(S) : Eric Maziers It is certified that error appears in the above-identified patent and that said Letters Patent is hereby corrected as shown below:

On the Cover page of the Patent:

(74) take out "Kruegar" and add --Krueger--

Signed and Sealed this

Sixteenth Day of November, 2010

David J. Kappos
*Director of the United States Patent and Trademark Office*